2,986,558
Patented May 30, 1961

2,986,558

PROCESS FOR STABILIZING SOLUTIONS OF CELLULOSE DERIVATIVES

Arnoldus Johannes Ultee, Waynesboro, Va., assignor to E. I. du Pont de Nemours and Company, Wilmington, Del., a corporation of Delaware No Drawing. Filed July 31, 1958, Ser. No. 752,184

10 Claims. (Cl. 260—212)

This invention relates to solutions of organic cellulose derivatives, and to methods for increasing the stability of such solutions.

Cellulose acetate is usually prepared by treating cellulose with a mixture of acetic anhydride and a catalyst, usually sulfuric acid, in a suitable solvent, usually acetic acid. When acetylation is substantially complete, there results a highly viscous solution containing cellulose triacetate, sulfuric acid, and any remaining acetic anhydride, dissolved in acetic acid. The cellulose triacetate can then be saponified ("ripened") to the acetone-soluble form by adding dilute acetic acid and heating. After saponification, there results a solution containing secondary cellulose acetate, sulfuric acid, water, and acetic acid. The use of either solution in the manufacture of shaped articles, for example, in forming filamentary structures by wet or dry spinning, is highly desirable. However, the inherent instability of the cellulose acetate in such solutions, owing to the presence of the sulfuric acid catalyst, does not permit such operations. Upon standing in solution, the cellulose acetate undergoes a gradual molecular weight degradation, evidenced by the progressive lowering of the viscosity of the solution, and also a deacetylation, depending on the quantity of water present.

The above difficulties have been overcome, in part, by treating such solutions with certain agents capable of neutralizing the catalyst, such as sodium acetate or ethanolamine. However, the salts which are formed are difficult to remove by either filtration or centrifuging and cause serious problems in the subsequent manufacturing operations. In dry spinning, for example, the salts cause polymer degradation, corrosion, and poor fiber properties while in wet spinning, the salts create special recovery problems. In spray drying, the salts remain in the flake as a serious contaminant.

Therefore, an object of this invention is to provide stable solutions of organic cellulose derivatives free from impurities. Another object is to provide a novel method for stabilizing solutions of organic cellulose derivatives.

In general, the objects of this invention are accomplished by contacting a solution of an organic cellulose derivative, as obtained directly from a preparative or saponification reaction, with a weakly basic anion exchange resin. Such a treatment results in essentially complete removal of any strong catalyst acid present and yields a stable solution of the organic cellulose derivative, suitable for use in the manufacture of shaped articles.

The invention is illustrated by the following examples. All parts and percentages are by weight:

*Example I*

One gallon of a solution of cellulose triacetate (acetylated cellulose containing from 2.7 to 3.0 acetyl groups per glucose unit) having the following composition:

| | Percent |
|---|---|
| Cellulose triacetate | 10.7 |
| Water | 1.6 |
| Sulfuric acid | 0.6 |
| Acetic acid | 87.1 | is admixed at room temperature with 150 grams (wet weight—40 grams dry weight) of "Amberlite IR-4B" (believed to be a weakly basic, polyamine, phenol-formaldehyde resin), previously washed with glacial acetic acid. After the resin settles, it is removed by filtration. Samples of the solution give no precipitate when treated with solutions of either barium acetate or lead acetate, in acetic acid, indicating that no free sulfuric acid is present. When the cellulose acetate is precipitated with water and filtered off, the filtrate does not give a precipitate with aqueous barium acetate, also indicating that no free sulfuric acid is present. A dilution series shows that one percent of the original amount of sulfuric acid gives a positive test with these reagents. Further, the solution maintains a constant viscosity (ca. 100 poises) while standing for a period of three weeks, whereas a solution of the same composition, but untreated, suffers a 42% loss in viscosity after standing for one week. Analysis shows that the cellulose acetate in the treated solution contains 2.88 acetyl groups per glucose unit after three weeks, whereas the cellulose acetate from the untreated solution contains only 2.28 acetyl groups per glucose unit after one week. Finally, the amount of combined sulfate is reduced by a factor of 65% by treatment with the anion exchange resin.

*Example II*

Two gallons of cellulose triacetate solution of the composition used in Example I is admixed at 55–60° C. with 250 grams of "Duolite A-4" (believed to be a weakly basic tertiary amine anion exchange resin), previously washed with glacial acetic acid. After filtration, a sample of the solution is treated with water to precipitate the cellulose acetate. The supernatant liquid is treated with aqueous barium acetate and does not give a precipitate, indicating that no free sulfuric acid is present. The remaining solution maintains a constant viscosity throughout the two week test period.

*Example III*

One gallon of a solution of secondary cellulose acetate (acetylated cellulose containing from 2.0 to 2.6 acetyl groups per glucose unit) obtained from the saponification of cellulose triacetate and having the following composition:

| | Percent |
|---|---|
| Cellulose acetate | 10.3 |
| Water | 11.7 |
| Sulfuric acid | 1.2 |
| Acetic acid | 76.8 | is treated as described in Example I. No free sulfuric acid is detected by the above described chemical tests, and the viscosity (ca. 50 poises) remains constant throughout an eight-day test.

When solutions of the above composition are treated with barium acetate, lead acetate, or sodium acetate respectively instead of with the anion exchange resin as in Example I degradation and hydrolysis of the cellulose acetate is halted. However, the precipitated sulfates are suspended in the solution, and can not be readily removed by conventional filtration or centrifuging methods.

*Example IV*

A solution having the composition shown in Example III is passed continuously through a bed of 10 cubic feet of "Amberlite IR-45" (believed to be a weakly basic, polyamine, cross-linked polystyrene resin) at a rate of 605 pounds per hour. The treaded solution indicates no free sulfuric acid when chemically treated as described in Example I.

*Example V*

Solutions of cellulose triacetate of the same composition as Example I, but containing perchloric acid and p-toluene sulfonic acid respectively instead of $H_2SO_4$, are stabilized in a manner similar to that as described in Example I. After one week there is no observable loss in viscosity in either solution.

*Example VI*

A sample of the "Amerlite IR-4B" resin used to stabilize the cellulose acetate solutions of Example I is regenerated by washing with a solution of about 5% sodium acetate in 80% acetic acid. Under such conditions, the residual cellulose acetate does not precipitate. Washing is continued with 80% acetic acid until sodium sulfate is no longer present in the filtrate. The regenerated resin is then used to stabilize solutions of cellulose acetate of the same composition as in Example I. Over 99% of the free sulfuric acid originally present is removed, and the solution viscosity remains constant for a one week test period.

The examples are described in terms of secondary cellulose acetate and cellulose triacetate, because of the acknowledged commercial importance of these compositions. However, any organic cellulose derivative solution can be stabilized according to the present invention, including solutions of the higher cellulose esters, ether esters and the like.

In addition to the use of "Amberlite IR-4B" and "Amberlite IR-45" other resins have been employed in the process of this invention. "Duolite A-4," also believed to be a polyamine polystyrene resin, has been used with success. In general, any weakly basic anion exchange resin can be used in the present process, their identity as such being well known (see, for example, F. C. Naehod and J. Schubert, "Ion Exchange Technology," Academic Press Inc., New York, 1956).

Preferably, the anion associated with the exchange resin should be derived from a weak acid having a dissociation constant ($Ka$) of less than about $10^{-4}$ to prevent deacylation of the cellulose derivative by the production of strong acids through the exchange reaction. The nature of the acid formed by the exchange reaction is preferably such that not only is it weakly ionized in the reaction medium, but is also completely soluble, to avoid contamination of the product upon isolation.

Most preferably, the anion associated with the exchange resin is derived from acetic acid, particularly from the standpoint of ease of regeneration of the resin in that form. Furthermore, the acid produced by the exchange reaction; i.e., acetic acid, is a solvent for the cellulose derivative, resulting in an effective de-ionization of the solution. The resins are preferably washed with glacial acetic acid, prior to treating solutions of cellulose derivatives therewith, in order to convert the resin to the acetate form.

The amount of resin utilized according to this invention depends on the amount of acid present and the capacity of the particular resin used. For example, "Amberlite IR-45" has a capacity of about 6 milliequivalents of anion per gram (wet weight). While as little as 40 grams (dry weight) of the anion exchange resin is sufficient to remove the sulfuric acid from a gallon of the solution of Example I, excess amounts of the resin are preferred to insure complete removal of the catalyst acid in less time.

A variety of catalyst acids can be removed by this treatment. In addition to those exemplified, other inorganic catalyst acids, such as hydrochloric acid, hydrobromic acid, nitric acid, and phosphoric acid can be removed by anion exchange resins, as can organic acids, such as methanesulfonic acid, and trichloro- and trifluoroacetic acid. The ionization of the catalyst acid is related to the solvent system employed. For anion exchange to proceed at a satisfactory rate, the acid should be (sufficiently) ionized in the solvent used, i.e., exhibit "strong acid" behavior. In glacial acetic acid, sulfuric and perchloric acids are the strongest of those mentioned, and are removed most efficiently by the anion exchange treatment. Other solvents which are commonly used in preparing cellulose derivatives include methylene chloride, dimethylformamide, and the higher fatty acids. In general, if the acid exhibits good catalytic behavior in a given solvent, it is ionized to a sufficient degree to be removed by treating with anion exchange resins.

Stabilization according to this invention has been carried out in acetic acid solutions containing as little as 1.6% water. In some experiments, the water content is reduced to less than 0.5%, and more than 99% of the sulfuric acid is removed. The anion exchange reaction is slower as the water content approaches zero; however, the efficiency of the treatment remains high. The present invention comprehends the use of solutions containing upwards to about 15% water, such concentrations being normally encountered in solutions obtained from the saponification of the organic cellulose esters.

Solutions of cellulose derivatives can be stabilized by either a batch or a continuous process. In continuous processing, the resin is placed in a column, supported in the form of a deep bed. The design and construction of such columns is well-known in the art. The solution is allowed to flow through the column at a rate sufficient to remove substantially all of the catalyst acid. If the solutions are highly viscous, a pressure differential may be applied. The exchange is usually carried out at room temperature, although higher temperatures can be used, provided such temperatures are not harmful to either the resin or the cellulose derivative.

Regeneration of the resin may be accomplished by washing with a solution of sodium acetate in 80% acetic acid. Such solutions do not cause the residual cellulose derivative on the resin to precipitate. The concentration of sodium acetate in solution is usually from 5 to 10%. Other suitable regenerants include strong bases, for example, calcium hydroxide, sodium hydroxide and the like. After regeneration is complete, i.e., when sulfate ions no longer appear in the wash liquor, the resin is rinsed with glacial acetic acid, and is then ready for further use. If the resin has been used in a column, the regeneration procedure is conveniently carried out by reversed-flow operations, which remove any impurities filtered by the resin, as well as redistributing the resin on the column.

Solutions of organic cellulose derivatives stabilized according to the present invention can be stored for relatively long periods of time without loss of substituent groups or molecular weight degradation of the cellulose chain. Such solutions are suitable for use in many manufacturing operations, such as wet or dry spinning, or the casting of films and the like.

The present process permits isolation of a cellulose derivative from a reaction product mixture simply by evaporating a solvent (e.g., spray drying), thereby eliminating the usual manufacturing steps of precipitation, stabilization, filtration, and drying. Since the resin can be regenerated, and can be used in a continuous process, the practice of this invention is very economical. An additional and unexpected advantage is that the present process removes combined acid e.g., sulfuric from the cellulose derivatives, substantially improving the thermal stability of the product. Other advantages inherent in the practice of this invention will occur to those undertaking its practice.

The claimed invention:

1. The process of stabilizing a solution containing an organic cellulose derivatives and a strong catalyst acid comprising the steps of contacting the solution with a weakly basic anion exchange resin to remove the anionic component of the acid from the solution and, after the exchange reaction, separating the solution and the resin.

2. The process of claim 1 wherein the anion exchange resin is associated with an anion derived from a weak acid having a dissociation constant of less than about $10^{-4}$.

3. The process of claim 1 wherein the strong catalyst is sulfuric acid and the sulfate radical is removed from the solution in the exchange reaction.

4. The process of claim 3 wherein the cellulose derivative comprises cellulose triacetate.

5. The process of claim 4 wherein the cellulose triacetate is in solution with acetic acid.

6. The process of claim 3 wherein the cellulose derivative comprises secondary cellulose acetate.

7. The process of claim 6 wherein the secondary cellulose acetate is in solution with acetic acid.

8. The process of stabilizing a solution comprising acetic acid, an organic cellulose acetate, and sulfuric acid comprising the steps of passing the solution through a bed of an anion exchange resin in the acetate form to remove the sulfate radical from the solution.

9. In the process of preparing an organic cellulose derivative using a strong acid catalyst, the improvement which comprises contacting a mixed solution of the organic cellulose derivative and the strong acid catalyst with a weakly basic anion exchange resin to remove the anionic component of the acid from the solution and, after the exchange reaction, separating the solution and the resin.

10. The process of claim 9 wherein the cellulose derivative is cellulose acetate.

References Cited in the file of this patent

UNITED STATES PATENTS

| | | |
|---|---|---|
| 2,072,260 | Haney | Mar. 2, 1937 |
| 2,152,071 | Malm | Mar. 28, 1938 |
| 2,165,850 | Gruber et al. | July 11, 1939 |
| 2,259,462 | Fletcher | Oct. 21, 1941 |
| 2,317,767 | Hofmann et al. | Apr. 27, 1943 |
| 2,432,341 | Seymour | Dec. 9, 1947 |

OTHER REFERENCES

Rohm & Haas Company, Amberlite Ion Exchange, Philadelphia, Pa., September 1953, p. 9.